G. KNOX.
CONTROLLING DEVICE FOR REFRIGERATING SYSTEMS.
APPLICATION FILED JULY 26, 1910.
1,103,885.
Patented July 14, 1914.
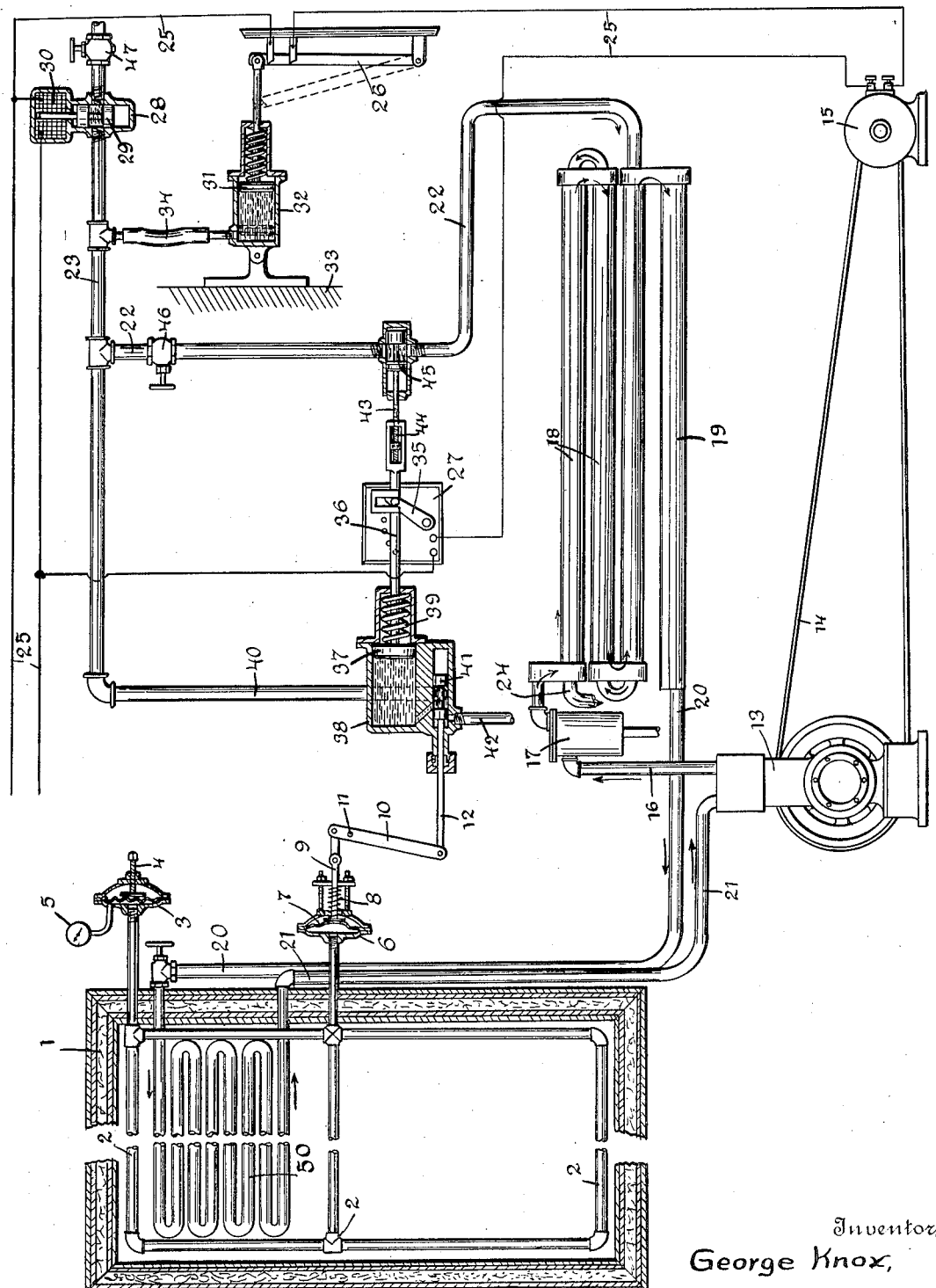
Inventor.
George Knox,
By David O. Barnell,
Attorney.
Witnesses:
J. E. Situs
Chas. W. Goodall

UNITED STATES PATENT OFFICE.

GEORGE KNOX, OF OMAHA, NEBRASKA, ASSIGNOR OF ONE-HALF TO J. L. BAKER, OF OMAHA, NEBRASKA.

CONTROLLING DEVICE FOR REFRIGERATING SYSTEMS.

1,103,885.

Specification of Letters Patent.

Patented July 14, 1914.

Application filed July 26, 1910. Serial No. 574,010.

*To all whom it may concern:*

Be it known that I, GEORGE KNOX, a citizen of the United States, and a resident of Omaha, in the county of Douglas and State of Nebraska, have invented certain new and useful Improvements in Controlling Devices for Refrigerating Systems, of which the following is a specification.

My invention relates to devices for regulating temperatures in refrigerating systems.

It is the object of my invention to provide an entirely automatic regulating mechanism for use with refrigerating systems employing elastic-fluid compressors actuated by electric motors.

More particular objects of my invention are to provide automatic mechanism for this purpose which may be actuated by fluid-pressure, such as the water supply for the condenser coils of the elastic-fluid compressing system, and by which the electric supply will be cut off upon failure of the water supply, and the water supply cut off upon failure of the electric supply, so that in either event no waste either of water or electrical energy will take place.

The accompanying drawing is a diagrammatic view showing the general construction and connections of my regulating system.

In the drawing a portion of the casing 1 of the refrigerating storage chamber is represented at the left of the sheet. Within said chamber is disposed a thermostatic device comprising pipes 2 preferably arranged to pass through the upper, lower and intermediate portions of the chamber, as shown, and connected with each other so as to form a closed receptacle of considerable capacity which may be filled with an expansible liquid, such as alcohol. At some part of the said liquid receptacle a shell 3 is connected therewith, the chamber within the shell having one side thereof formed by a diaphragm which may be pressed inwardly by means of the adjusting-screw 4 to vary the pressure upon the liquid in the receptacle. A suitable pressure gage 5 is also connected with the receptacle, as shown. A shell 6 is connected with the pipes 2 at one side of the casing 1, and the chamber within said shell is closed at one side by a diaphragm 7 which is normally pushed inwardly by a spring 8. To the diaphragm 7 is connected a rod 9 which is connected by means of a short link to the upper end of the lever 10. Said lever is fulcrumed at 11 and to the lower end thereof is connected the valve-rod 12 which controls the hydraulic piston used for actuating the motor rheostat. When the temperature in the refrigerating chamber falls below that for which the thermostatic device is adjusted, the reduction in volume of the liquid in the pipes 2 permits the spring 8 to push the diaphragm 7 inwardly and thus move the rod 12 in one direction, while the expansion of the liquid in the pipes 2 by an increase of temperature in the refrigerating chamber pushes the said diaphragm outwardly and moves the valve-rod in the opposite direction.

The elastic-fluid compressor 13 is shown as driven by a belt 14 from the electric motor 15. The fluid passes from the compressor through the discharge pipe 16, to an oil-separator 17, and thence to the condenser pipes 18 where the compressed gas is cooled sufficiently to reduce it to a liquid which collects in the reservoir 19. From the reservoir the liquid is conveyed by suitable piping 20 to the expansion coils 50 in the storage chamber and thence to the inlet-pipe 21 of the compressor.

The water for cooling the condenser is supplied through a branch pipe 22 from the water-supply pipe 23, and is discharged from the condenser through the pipe 24. The electrical supply wires 25 are connected with the motor through a switch 26 and an ordinary rheostat 27.

In the water supply pipe 23 is disposed an electrically controlled valve comprising a casing 28, a balanced piston-valve 29 having a portion thereof made of magnetic material, and an electromagnet 30 arranged at the upper end of the casing 28. The said electromagnet is connected in a shunt from the electrical supply wires 25. When energized holds the piston-valve in raised position, as shown, and when not energized permits said valve to descend by gravity until the water supply is cut off thereby.

The switch 26 is connected with the rod of a piston 31 working in a cylinder 32 shown as pivotally mounted upon a support 33. A spring is arranged so as to push the piston into the cylinder and open the switch, as indicated by the dotted lines in the drawing. The piston is normally pushed outward and the switch held closed by the pressure of water within the cylinder, supplied through the flexible connection 34 from the pipe 23.

The handle 35 of the rheostat is engaged by a yoke formed on the rod 36 of a piston 37 which works in the cylinder 38. The said piston is pushed into the cylinder by a spring 39 and is pushed outwardly by the pressure of water supplied through the pipe 40. The admission of water to the cylinder and its escape therefrom are controlled by the balanced piston-valve 41 which works in a valve-cylinder formed integrally with the cylinder 38. The said piston-valve is connected with the valve-rod 12 which by its movement in one direction causes the valve to open a port connecting the pipe 40 with the cylinder, and by its movement in the other direction closes the inlet from the pipe 40 and connects the cylinder port with the exhaust or waste-pipe 42. An extension of the rod 36 is connected with the valve-rod 43 by means of an adjustable slip-joint 44 which is so arranged that the rod 36, near the end of each stroke thereof, will move the said valve-rod slightly and cause the balanced piston-valve 45 with which it is connected to turn on or cut off the supply of water to the condenser through the pipe 22. A manually-controlled valve 46 arranged in said pipe 22 enables the supply of water to the condenser to be regulated, and a similar valve 47 is arranged in the supply pipe 23.

The operation of the mechanism will be apparent by reference to the drawing.

There being a proper supply of electrical energy to the wires 25, the electromagnet 30 will hold open the valve 29 which controls the water supply through the pipe 23. The water pressure through the pipe 23 being maintained, the piston 31 is held in the position shown and the switch 26 kept closed. As long as the temperature of the refrigerating chamber exceeds the normal, the pressure of the fluid in the thermostatic device upon the diaphragm 7, acting through the rod 9, lever 10, and valve-rod 12, keeps the piston-valve 41 in the position shown, and the water pressure from the pipe 40 upon the piston 37 holds the handle of the rheostat in such position as to keep the motor 15 and the compressor 13 in operation, and thus maintain the supply of refrigerant to the storage chamber. When the temperature in the storage chamber falls below the normal, the contraction of the fluid in the thermostatic device permits the diaphragm 7 to be pushed inwardly by the spring 8, and the valve 41 to be thus moved to a position such as to cut off the water pressure from the cylinder 38 and open the cylinder port to the waste-pipe 42. The piston 37 is then pushed inwardly by the spring 39 so that the supply of electrical energy to the motor is cut off by the rheostat, and, at the conclusion of said movement of the piston 37 and rod 36, the valve 45 is actuated to cut off the supply of water to the condenser. The rising of the temperature in the storage chamber causes the valve 41 to be again moved so as to admit water to the cylinder 38, and the rod 36 is moved so as to turn on the rheostat and actuate the valve 45 to start the water supply to the condenser. Should the water supply fail at any time, the absence of pressure in the cylinders 32 and 38 permits the pistons 31 and 37 to be moved inwardly by the springs bearing thereon, and the motor circuit is thus thrown open both at the switch 26 and the rheostat. When the water pressure is restored the motor will be again started by the closing of said switch and the turning of the rheostat handle. A failure of the electrical supply will cause a similar operation by permitting movement of the valve 29 to cut off the water supply.

Now, having described my invention, what I claim and desire to secure by Letters Patent is:

1. In a refrigerating system, the combination with a storage chamber, an elastic-fluid compressor, a motor for actuating the same, a condenser, means for supplying water to the condenser, and means for utilizing the compressed elastic fluid to cool the storage chamber, of means controlling the stopping and starting of the motor, means controlling the supply of water to the condenser, a fluid-pressure-actuated piston for actuating the motor-controlling and water controlling means, a valve controlling the fluid-pressure on said piston, and a thermostatic device arranged in the storage chamber and operatively connected with said valve.

2. In a refrigerating system, the combination with a storage chamber, an elastic-fluid compressor, an electrical motor for actuating the compressor, and means for utilizing the compressed elastic fluid to cool the storage chamber, of a rheostat for controlling the electrical motor, a fluid-pressure-actuated piston connected with said rheostat, a valve controlling the fluid-pressure on said piston, and a thermostatic device connected with said valve and caused to actuate the same by changes of temperature in the storage chamber.

3. In a refrigerating system, the combination with an elastic-fluid compressor, a water-cooled condenser therefor, and an electrical motor for actuating the same, of a rheostat controlling the starting of the motor, a water supply pipe connected with the condenser, a piston connected with the starting rheostat, means tending to actuate the piston to turn off the rheostat, a cylinder inclosing the piston and connected with the water supply pipe for the condenser so that while pressure is maintained in said pipe the piston may be actuated thereby to turn on the rheostat, a valve adapted and normally tending to shut off the water supply, and electrically controlled means for holding said valve open.

In testimony whereof I have hereunto subscribed my name in the presence of two witnesses.

GEORGE KNOX.

Witnesses:
D. O. BARNELL,
ROY G. KRATZ.